United States Patent [19]

Suzuki et al.

[11] Patent Number: 4,971,003

[45] Date of Patent: Nov. 20, 1990

[54] PISTON OF ALUMINUM ALLOY FOR INTERNAL COMBUSTION ENGINES

[75] Inventors: Yoshihiro Suzuki, Saitama; Shigeru Tanoue, Ageo, both of Japan

[73] Assignee: Izumi Industries, Ltd., Kawagoe, Japan

[21] Appl. No.: 507,769

[22] Filed: Apr. 12, 1990

[30] Foreign Application Priority Data

Apr. 20, 1989 [JP] Japan .................................. 1-101298

[51] Int. Cl.⁵ .............................................. F02F 3/00
[52] U.S. Cl. ............................. 123/279; 123/193 P; 92/212; 29/888.043
[58] Field of Search .............. 123/193 P, 279; 92/212, 92/222, 223; 29/888.042, 888.043, 888.046

[56] References Cited

U.S. PATENT DOCUMENTS

| | | | |
|---|---|---|---|
| 3,807,014 | 4/1974 | Hummel | 29/888.043 |
| 4,495,684 | 1/1985 | Sander et al. | 123/193 P |
| 4,662,326 | 5/1987 | Kohnert | 123/193 P |
| 4,711,208 | 12/1987 | Sander et al. | 123/279 |
| 4,920,864 | 5/1990 | Skingle et al. | 92/212 |
| 4,942,804 | 7/1990 | Matsuura et al. | 123/279 |

*Primary Examiner*—Andrew M. Dolinar
*Assistant Examiner*—M. Macy
*Attorney, Agent, or Firm*—Jones, Day, Reavis & Pogue

[57] ABSTRACT

A fiber reinforced wire set along the edge of an open combustion chamber, which is provided in the piston head of a piston, is remelted with the edge of the combustion chamber, and solidified in order to reinforce the edge of the combustion chamber.

3 Claims, 2 Drawing Sheets

PISTON OF ALUMINUM ALLOY FOR INTERNAL COMBUSTION ENGINES

BACKGROUND OF THE INVENTION

1. Field of the Invention

This invention relates to a piston of aluminum alloy for internal combustion engines, and is particularly but not exclusively applicable to piston for direct-injection-type diesel engines.

2. Description of the Prior Art

A combustion chamber 2, for example, illustrated in FIG. 4, which is provided in the piston head 1a of a piston 1 for internal combustion engines, is locally overheated by hot gases under high combustion pressure, so that cracks are often initiated at the edge 2a of the combustion chamber 2, and propagated in the radius direction of the piston 1.

To overcome such problem, a preform 3 of ceramic fiber, which has a predetermined density, is annularly formed to correspond with the edge of the combustion chamber, and set in a metal mold. After a molten aluminum alloy is poured into the metal mold, the piston is casted under a predetermined pressure so that the molten alloy may be penetrated into the preform 3. Thus, the strength of the edge of the combustion chamber is much improved However, in the pressure casting, the pressure of 600 to 1200 kg/cm$^2$ is applied to the molten alloy, so that the used casting equipment and the metal mold must be endurable under such high pressure. Thus, the cost of the piston becomes extremely heavier than that of a piston obtained by means of gravity casting. Further, in the pressure casting, a segmented core can not be used as the melt penetrates into the separated part of the core. Therefore, it becomes impossible to make an undercut 4 on the inside of the piston.

Generally, it is preferable that each filament of the ceramic fiber used for such preform is arranged as much as possible in a direction perpendicular to the propagation of cracks when a metal is reinforced by the ceramic fiber, and thus, the filaments should be arranged along the circular edge of the combustion chamber. However, it is difficult to arrange the filaments of the ceramic fiber as much as possible in such direction when the preform 3 is annularly formed during the production of preform 3. Therefore, the preform 3 can not completely interfere with the cracks initiated and propagated in the direction perpendicular to the annular edge 2a of the combustion chamber 2.

In the meanwhile, such difficulty derives from the preform 3 being formed in such a manner that a slurry including the ceramic fiber of short filaments is filtered under reduced pressure. That is, the filaments passing through the filter are apt to be arranged in a direction for being filtered, and thus, the filaments are arranged rather at random on a surface which is parallel to the filter, so that it is difficult to arrange the filaments annularly.

If the short filaments are substituted by long ones, it seems easy to arrange the filaments annularly, but it takes plenty of time to arrange the filaments, and also, it becomes difficult to adjust the volumetric ratio of the filaments, so that the cost of the preform will rise.

OBJECTS AND SUMMARY OF THE INVENTION

Accordingly, it is an object of the present invention to provide a piston of aluminum alloy for internal combustion engines in which the edge of a combustion chamber, which is provided in the piston, is much reinforced notwithstanding the production cost of a preform, which is used to reinforce the edge of the combustion chamber, is reduced as compared with that of the conventional one.

Another object of the invention is to provide a piston of aluminum alloy for internal combustion engines, which is not manufactured by pressure casting in spite of the fact that the edge of a combustion chamber, which is provided in the piston, is reinforced by a preform, so that an expensive casting equipment and an expensive metal mold are not required, and thereby, the production cost of the piston is reduced.

A further object of the invention is to provide a piston of aluminum alloy for internal combustion engines, which is manufactured by gravity casting in order that an undercut can be made on the inside thereof.

Still a further object of the invention is to provide a piston of aluminum alloy for internal combustion engines, in which an aluminum alloy included in a fiber reinforced wire, which is used for reinforcing the piston locally, may differs from an aluminum alloy which forms the piston itself, so that the kind of the aluminum alloy of the fiber reinforced wire can be selected freely to fit a purpose of using it.

Still another object of the invention is to provide a piston of aluminum alloy for internal combustion engines in which a fiber reinforced wire used for locally reinforcing the piston is remelted by high-energy radiation with a part of the piston, which is adjacent to the fiber reinforced wire, so that the fiber reinforced wire may be made completely integral with the part of the piston. After the fiber reinforced wire and the part of the piston, which is adjacent to the fiber reinforced wire, are remelted, they are rapidly cooled by a cold surrounding thereof, and thereby, solidified in predetermined directions, so that casting defects, such as pin holes or blow holes, are hardly developed.

In accordance with an aspect of this invention, in a piston of aluminum alloy for internal combustion engines, a ceramic-fiber reinforced wire set along the edge of an open combustion chamber, which is provided in the piston, is remelted by high-energy radiation with the edge of the combustion chamber, and solidified in order to reinforce the edge of the combustion chamber.

In a preferred embodiment of this invention, the ceramic-fiber reinforced wire is made by means of extruding or drawing a billet of ceramic-fiber reinforced aluminum alloy so that the filaments of the ceramic fiber may be arranged in paralled with a direction for the ceramic fiber being extruded or drawn.

Moreover, the volumetric ratio of the ceramic fiber is in a range of 5 to 30%, and the arrangement ratio thereof is 60% or more, when the ceramic fiber is made by means of extruding or drawing a billet.

The above, and other objects, features and advantages of this invention, will be apparent from the following detailed description of an illustrative embodiment thereof to be read in connection with the accompanying drawings, whrein like reference numerals identify the same or corresponding parts in the several views.

DETAILED DESCRIPTION OF A PREFERRED EMBODIMENT

Figure 1:
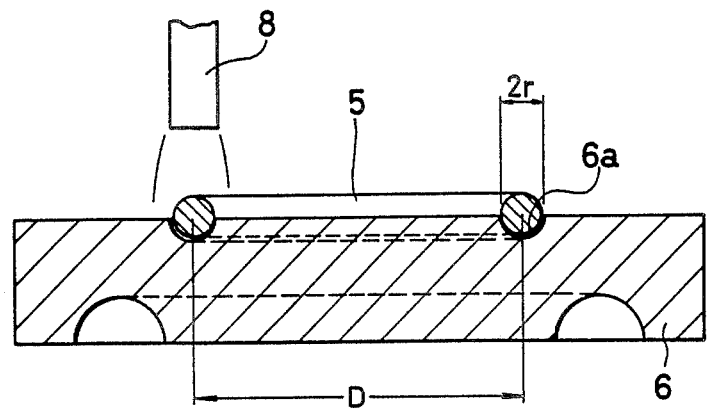
FIG. 1 is an explanatory view showing how to make test pieces extracted from a piston according an embodiment of this invention.
Figure 2:
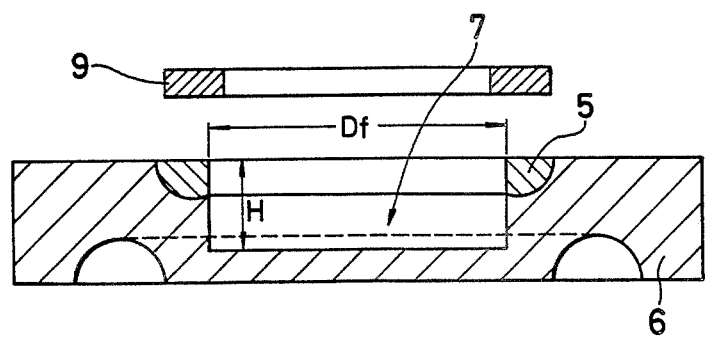
FIG. 2 is an explanatory view showing how to test the test pieces of FIG. 1.
Figure 3:
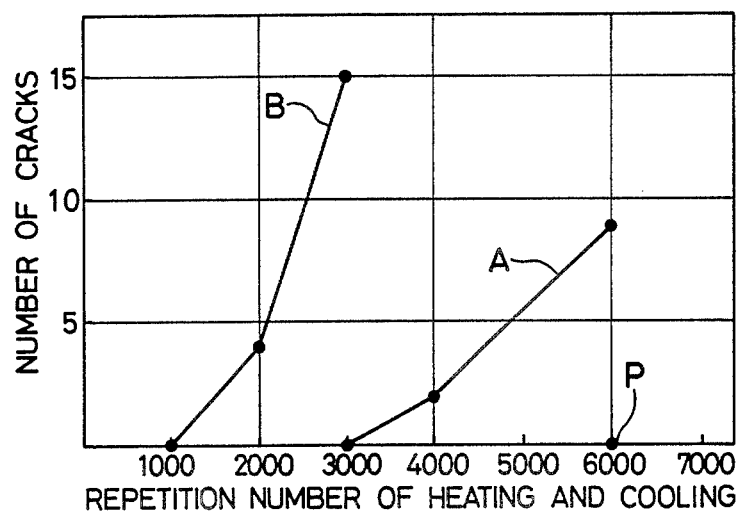
FIG. 3 is a graphical representation of a repetition number of heating and cooling - number of cracks relationship present in the test pieces of FIG. 2.
Figure 4:
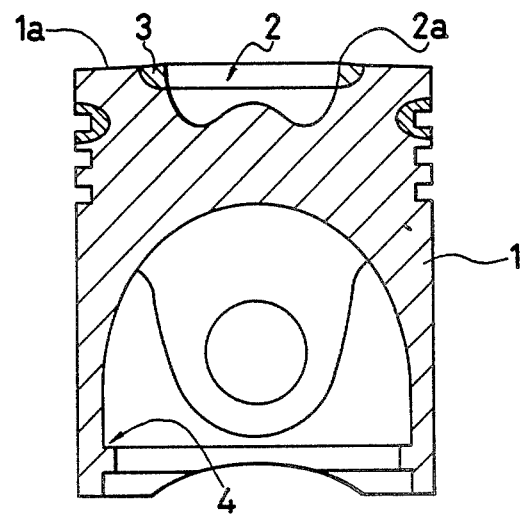
FIG. 4 is a sectional view of a conventional piston.

Referring to FIGS. 1 to 3, a piston for a direct-injection-type diesel engine, to which this invention is applied, will be described.

Firstly, a billet of an aluminum alloy including a ceramic fiber, the volumetric ratio $V_f$ of which is in a range of 5 to 30%, is made, and to obtain a fiber reinforced wire 5, it is extruded or drawn while hot. At that time, the extrusion or drawing of the billet is so adjusted as the filament arrangement ratio of the ceramic fiber becomes more than 60% inclusive. The filament arrangement ratio is defined as a percentage of filaments, which forms an angle of 30° or less with a direction for the billet being extruded or drawn, to all the filaments of the ceramic fiber. The percentage is examined in a section parallel to the direction for the billet being extruded or drawn.

Then, the fiber reinforced wire 5 is annularly formed substantially in accordance with the diameter of the edge 2a of an open combustion chamber 2 which is provided in a piston 1, and embedded in the edge 2a. Thus, the fiber reinforced wire 5 is remelted by high-energy radiation with a part of the edge 2a of the combustion chamber 2, which is adjacent to the fiber reinforced wire 5, and thereby, the fiber reinforced wire 5 becomes completely integral with the edge 2a. The high-energy radiation is generated by a TIG-welder or a laser beam generator, and the ceramic fiber of the billet is made of alumina, silicon carbide, silicon nitride, or alumina-silica, which may be crystalline, amorphous or whiskery.

Moreover, the filament of the ceramic fiber has preferably a diameter of 15 $\mu$m or less from a viewpoint of the compounding characteristic of the piston and the extruding or drawing characteristic of the billet, and has preferably a length of 1 mm or less so as to obtain such a billet as the ceramic fiber thereof has a necessary high volumetric ratio $V_f$.

The reason why the volumetric ratio is selected in a range of 5 to 30% is assigned as follows. If $V_f$ is less than 5%, it becomes difficult to improve the strength of the aluminum alloy by mixing the ceramic fiber, and if $V_f$ is more than 30%, it becomes difficult to plastically work the billet. Further, the filaments of the ceramic fiber are entangled with one another while the billet is plastically worked, and as a result, an improvement of the filament arrangement ratio can not be obtained. The strength of the aluminum alloy is improved as the filament arrangement ratio increases, but if the arrangement ratio exceeds 60%, the strength is hardly improved.

Generally, the strength of the aluminum alloy is improved, as the length of the filament and the filament arrangement ratio increase. The filament is cut off during extruding or drawing of the billet, and there are the following relationships among the length of the filament after plastic working, the arrangement ratio of the filaments in the fiber reinforced wire, the rate of plastic working of the billet, and the temperature at the time of plastic working. The rate of plastic working has a normal correlation with the arrangement ratio, and a reverse correlation with the length of the filament. Further, the temperature at the time of plastic working has a reverse correlation with the arrangement ratio, and a normal correlation with the length of the filament. Thus, the arrangement ratio of 60% was determined referring to the above relationships.

A comparative test is made between a piston of this invention and a conventional piston reinforced by a preform. In the piston of this invention, a cylindrical preform, which is 45 mm in diameter and 45 mm in length, is firstly made of silicon-carbide whiskers which has $V_f$ of 15%, and each diameter and length of which are in a range of 1 to 0.1 $\mu$m and in a range of 10 to 300 $\mu$m, respectively. Then, the preform is set in a metal mold, and a molten aluminum, which has a purity of 99.7% and a temperature of 780° C., is poured into the metal mold under a pressure of 700 kg/cm² in order to penetrate the aluminum into the preform. Thus, a billet is obtained.

After the billet is machined to have a diameter of 40 mm and a length of 40 mm, the billet is plastically worked by extrusion working under a temperature of 640° C. and a pressure of 20,000 kg to obtain a fiber reinforced wire of 7 mm in diameter. At that time, the arrangement ratio is 95% on an average.

Thereafter, the fiber reinforced wire 5 is annularly formed as shown in FIG. 1. The ring 5 of fiber reinforced wire has a diameter D of 55 mm (FIG. 1).

On the other hand, a piston is made of aluminum alloy (JIS: AC8A), and as shown in FIG. 1, a test piece 6 for thermal shock test is cut out from the head of the piston. In the test piece 6, an annular groove 6a, the section of which is of semicircle of 4 mm, has been provided, and the ring 5 is fitted into the annular groove 6a.

The test piece 6 (hereinafter designated as the first test piece) is then preheated at a temperature 200° C. The ring 5 and the annular groove 6a are remelted by the help of a TIG-welder so far that the remelted depth becomes substantially 6 mm, and then, solidified. The welder is operated under a following condition, and reference numeral 8 (FIG. 1) denotes an electrode of the TIG-welder.

Voltage: 35 V; Current: 200 A; Feed Rate of Electrode: 100 mm/min.

As shown in FIG. 2, a recess 7, which has a diameter $D_f$ of 50 mm and a depth H of 15 mm, is provided in the central part of the first test piece 6. The recess 7 is imitated in configuration from an actual combustion chamber which is provided in a piston.

In another test piece (hereinafter designated as the second test piece) which is to be compared with the first test piece, a slurry which includes silicon-carbide whiskers is firstly filtered under reduced pressure. The silicon-carbide whiskers used are the same as those used in making the first test piece, and the diameter and the length of the silicon-carbide whisker are in a range of 1 to 0.1 $\mu$m and in a range of 10 to 300 $\mu$m, respectively.

After the whiskers are dried under a predetermined pressure, a preform is made. At that time, the volumetric ratio $V_f$ of the whiskers is 15%, and the figure and size of the preform are substantially the same as those of the ring 5 shown in FIG. 2.

Thereafter, the preform is set in a metal mold, and a molten aluminum alloy (JIS: AC8A) is poured into the metal mold so as to make a piston by pressure casting. The piston is then finished by machine to obtain the second test piece shown in FIG. 2.

In the comparative test, a high-frequency current is supplied to a heating coil 9, which is arranged as shown in FIG. 2, to repeat alternate heating and air-cooling at a temperature between 400° C. and 150° C. and at the period of 12 sec/cycle.

According to test results shown in FIG. 3, in case of the second test piece, cracks are found after a repetition of 4000 cycles as indicated in a polygonal line A, but in case of the first test piece, no crack is found after a repetition of 6000 cycles as indicated in point P.

In FIG. 3, there is illustrated a third test result which is obtained by testing such a test piece as to imitate a piston which is made by gravity casting, and whose edge of a combustion chamber is not reinforced at all. According to the third test result indicated in a polygonal line B, it is apparent that cracks easily initiate.

As may be seen from the above description, the strength of the edge of the combustion chamber, which is provided in the piston, is much improved due to application of this invention, and if mechanical repeated stresses, and thermal stresses caused by a local and repeated heating of high-temperature gases are imposed on the edge of the combustion chamber, the piston is surely prevented from being damaged.

What is claimed is:

1. A piston of aluminum alloy for internal combustion engines in which a ceramic-fiber reinforced wire set along the edge of an open combustion chamber, which is provided in the piston, is remelted by high-energy radiation with the edge of the combustion chamber, and solidified in order to reinforce the edge of the combustion chamber.

2. A piston according to claim 1, wherein the ceramic-fiber reinforced wire is made by means of extruding or drawing a billet of ceramic-fiber reinforced aluminum alloy so that the filaments of the ceramic fiber may be arranged in parallel with a direction for the ceramic fiber being extruded or drawn.

3. A piston according to claim 1, wherein the volumetric ratio of the ceramic fiber is in a range of 5 to 30%, and the arrangement ratio thereof is 60% or more, when the ceramic fiber is made by means of extruding or drawing a billet.

* * * * *